United States Patent
Fu et al.

(10) Patent No.: US 10,164,819 B2
(45) Date of Patent: Dec. 25, 2018

(54) CORRELATING WEB TRAFFIC EVENTS TO A WEB PAGE SESSION

(71) Applicant: Telefonaktiebolaget LM Ericsson (publ), Stockholm (SE)

(72) Inventors: Jing Fu, Solna (SE); Åsa Bertze, Spånga (SE); Icaro L. J. Da Silva, Bromma (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 126 days.

(21) Appl. No.: 15/100,864

(22) PCT Filed: Dec. 23, 2013

(86) PCT No.: PCT/EP2013/077952
§ 371 (c)(1),
(2) Date: Jun. 1, 2016

(87) PCT Pub. No.: WO2015/096857
PCT Pub. Date: Jul. 2, 2015

(65) Prior Publication Data
US 2016/0308706 A1     Oct. 20, 2016

(51) Int. Cl.
*G06F 15/173*     (2006.01)
*G06F 15/16*     (2006.01)
(Continued)

(52) U.S. Cl.
CPC .......... *H04L 41/064* (2013.01); *H04L 43/062* (2013.01); *H04L 43/0876* (2013.01); *H04L 67/10* (2013.01); *H04L 67/14* (2013.01)

(58) Field of Classification Search
CPC ....... H04L 43/04; H04L 67/22; H04L 41/064; H04L 43/062; H04L 43/0876;
(Continued)

(56) References Cited

U.S. PATENT DOCUMENTS

| 7,487,508 B2 | 2/2009 | Fu et al. | |
| 2006/0156404 A1* | 7/2006 | Day | H04L 63/1408 |
| | | | 726/23 |
| 2010/0202299 A1* | 8/2010 | Strayer | H04L 63/1408 |
| | | | 370/252 |

FOREIGN PATENT DOCUMENTS

| EP | 2 199 930 A1 | 6/2010 |
| WO | WO 2015/055231 A1 | 4/2015 |
| WO | WO 2015/062652 A1 | 5/2015 |
| WO | WO 2015/081988 A1 | 6/2015 |

OTHER PUBLICATIONS

International Search Report and Written Opinion of the International Searching Authority, Application No. PCT/EP2013/077952, Mar. 6, 2014.
(Continued)

Primary Examiner — Madhu Woolcock
(74) Attorney, Agent, or Firm — Sage Patent Group (57) ABSTRACT

In a system for conveying web content to a plurality of user terminals, web traffic events are correlated to a web page session. A method of operating the system includes inspecting web traffic involved in conveying the web content toward the user terminals for extracting web traffic events, associating the extracted web traffic events to one of said user terminals and to one of a plurality of event types, and building a statistic for values indicating times between two consecutive web traffic events that are associated to the same user terminal. The method further includes calculating from the statistic a deviation for a pair of event types, and correlating the web traffic events to a web page session based on the deviation.

17 Claims, 3 Drawing Sheets (51) Int. Cl.
*H04L 12/24* (2006.01)
*H04L 12/26* (2006.01)
*H04L 29/08* (2006.01)

(58) Field of Classification Search
CPC ......... H04L 67/02; H04L 67/10; H04L 67/14;
H04L 67/146; H04L 67/142; H04L
29/08693; H04L 43/045; H04L 43/10;
H04L 63/1425; H04L 67/306; H04L
63/1408
USPC .......................................... 709/224, 217, 206
See application file for complete search history.

(56) References Cited

OTHER PUBLICATIONS

Bayir et al., "A New Approach for Reactive Web Usage Data Processing", *Proceedings of the 22$^{nd}$ International Conference on Data Engineering Workshops (ICDEW'06)*, Atlanta, Georgia, Apr. 3-7, 2006, 10 pp.

Bayir et al., "Discovering better navigation sequences for the session construction problem", *Data & Knowledge Engineering*, vol. 73, Nov. 15, 2012, pp. 58-72.

Fielding et al., "HTTP 1.1: Header Field Definitions", downloaded Sep. 25, 2013 from http://www.w3.org/Protocols/rfc2616/rfc2616-sec14.html, 37 pp.

Gombotz et al., "On Web Services Workflow Mining", *Business Process Management Workshop—Lecture Notes in Computer Science*, Jan. 31, 2006, pp. 216-228.

Varnagar et al., "Web Usage Mining: A Review on Process, Methods and Techniques", *IEEE 2013 International Conference on Information Communication and Embedded Systems (ICICES)*, Feb. 21, 2013, pp. 40-46.

Zhang et al., "The Reconstruction of User Sessions from a Server Log Using Improved Time-oriented Heuristics", *Proceedings of the Second Annual Conference on Communication Networks and Services Research (CNSR'04)*, Jan. 31, 2004, 8 pp.

\* cited by examiner

CORRELATING WEB TRAFFIC EVENTS TO A WEB PAGE SESSION

CROSS REFERENCE TO RELATED APPLICATION

This application is a 35 U.S.C. § 371 national stage application of PCT International Application No. PCT/EP2013/077952, filed on Dec. 23, 2013, the disclosure and content of which is incorporated by reference herein in its entirety. The above-referenced PCT International Application was published in the English language as International Publication No. WO 2015/096857 A1 on Jul. 2, 2015.

TECHNICAL FIELD

The present invention relates to correlating web traffic events to a web page session in a system for conveying web content to a plurality of user terminals. Specifically, the present invention relates to corresponding methods, network entities, computer programs and computer program products. More specifically, the present invention relates to correlating web traffic events being extracted from a web traffic that is involved in conveying web content toward the user terminals to a web page session, in particular to one web page session carried out from one individual user terminal.

BACKGROUND

The use of the world wide web (WWW) has become an everyday activity all over the world. Usually, web users access web content as so-called web pages by specifying a corresponding address in some kind of user terminal, such as a stationary, mobile or tablet computer or a mobile phone with corresponding web access capabilities. Conventional user terminals may feature one or more applications (software) for accessing web pages, e.g. in the form of so-called browsers. These browsers handle the request for specified web content and the content's display to and interaction with the user.

All the transactions (requests, retrieval of resources, downloads, etc.) involved with the access of one web page by a user terminal are usually referred to as belonging to one web page session. In contrast to this, the web page as such is operated by the web page owner, is stored on one or more server nodes, and can be simultaneously accessed by a plurality of user terminals (users) during a corresponding plurality of web page sessions.

Generally, web content is organized in the form of web pages that can be individually addressed and accessed by specifying their respective web addresses. One common way for addressing web pages is the definition of locations where the corresponding content is stored. The internet with its so-called internet protocol (IP) provides the related IP addresses that are intended to identify one unique storage location. Since such IP addresses are in the form of several tuples of numbers, they are difficult to memorize and are usually not suitable for everyday public use. However, there exist the concept of the so-called domain name servers (DNS) that can translate plain text addresses into their associated IP address. In this way, there is an easy means available for accessing a web page by associating its content to a plain text address, such as "www.a.com".

The data objects related to the web content, e.g. all the text, image and multimedia files of one web page, are usually stored on one or more server node(s), which convey the related resources to the requesting terminal along one or more network nodes. Here, the latter mentioned network nodes stand for all the infrastructure that is involved for conveying the requested content from the server node to one user terminal. This infrastructure may include switching and routing nodes of local area networks (LAN), the internet, gateways and access nodes on the user's end, like ADSL nodes or mobile communication networks with their base station nodes (eNBs) and possibly also relay nodes. In general, there is usually a number of individual network nodes of one or more domains that handle the data traffic toward the user's end and thus convey the web content toward the terminal node. Likewise, the web traffic involved in conveying the web content toward the user terminals may include not only the traffic toward the user terminals but also the related request and configuration communication coming from the terminals (e.g. requesting one resource, setting up a TCP connection, etc.).

In general, the precise content of one web page may be known only to the web page owner that operates (offers) the web page by defining the contents and associated resources in the form of, for example, HTML code. Further, also the user that accesses the web page during a corresponding web page session can tell what resources and contents belong to one web page and what other resources do not. For example, the user may instruct his user terminal to load one web page, e.g. "www.a.com", and, during the user terminal accesses all the related objects and retrieves the resources belonging to that web page, the user may also request further web content from a second web page, say "www.b.com". In this situation, bath the user and the web page owner of "www.a.com" can tell what resources belong to web page "www.a.com" and what other resources, for example being requested and transmitted in conjunction to accessing web page "www.b.com", do not.

However, there is a need for correlating web traffic that is extracted or intercepted between a user terminal and one or more server nodes, i.e. at a location in the network where no direct information is available on what resource belongs to what web page, to one individual web page (session). More specifically, it is desirable to correlate web traffic events to individual web page sessions even without the explicit knowledge on the web page content as such, as this information is usually available to the web site owner and/or the accessing user only. This need may in particular appear in the context of operating network systems and observing associated performance metrics of such networks for the operation as such or optimization purposes.

SUMMARY

The above-mentioned objects and problems are solved by the subject-matter of the independent claims. Further preferred embodiments are defined in the dependent claims.

According to one aspect of the present invention, there is provided a method of correlating, in a system for conveying web content to a plurality of user terminals, web traffic events to a web page session, the method comprising the steps of inspecting a web traffic involved in conveying the web content toward the user terminals for extracting web traffic events; associating the extracted web traffic events to one of said user terminals and to one of a plurality of event types; building a statistic for values indicating times between two consecutive web traffic events that are associated to the same user terminal; calculating, from said statistic, a deviation for a pair of event types; and correlating said web traffic events to a web page session based on said deviation.

According to one aspect of the present invention, there is provided a network entity for correlating, in a system for conveying web content to a plurality of user terminals, web traffic events to a web page session, the network entity comprising processing resources configured to inspect a web traffic involved in conveying the web content toward the user terminals for extracting web traffic events; associate the extracted web traffic events to one of said user terminals and to one of a plurality of event types; build a statistic for values indicating times between two consecutive web traffic events that are associated to the same user terminal; calculate, from said statistic, a deviation for a pair of event types; and to correlate said web traffic events to a web page session based on said deviation.

According to further aspects of the present invention, there are provided related computer programs and computer program products.

BRIEF DESCRIPTION OF THE DRAWINGS

Embodiments of the present invention, which are presented for better understanding the inventive concepts and which are not to be seen as limiting the invention, will now be described with reference to the Figures in which.

DETAILED DESCRIPTION

Figure 1A:
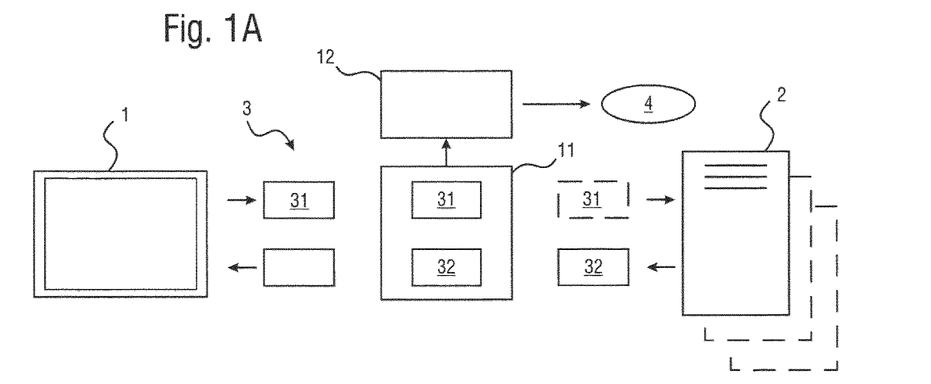
FIGS. 1A and 1B show schematic views of inspecting web traffic in system configurations for conveying web content and correlating web traffic events to a web page session according to embodiments of the present invention.

FIG. 1A shows a schematic view of inspecting web traffic in system configurations for conveying web content and correlating web traffic events to a web page session according to an embodiment of the present invention. The shown system involves a user terminal 1 configured to access web content during a web page session in the form of web page content (text, HTML), resources (images, multimedia, etc.), downloads, audio/video streams, remote application access, and the like. The user terminal 1 may take one of many common forms, including PCs, laptop computers, tablet computers, mobile phones, smartphones, and the like.

Usually, a browser application (software) is executed with the processing and memory resources of the user terminal 1. This browser software presents on a user interface of the user terminal 1 the content of the web page in form of text, images, graphic elements, animations, sound/music, and the like. By means of the operation elements of the user terminal 1, the user can interact with the web content including scrolling the field of view of the web page, magnifying or downscaling of the displayed content, and selecting links that may lead to other parts of the same web page or to other web pages. Common input means include keyboards, individual keys, mice and other pointing devices, touch screens, and the like.

The corresponding data of the web content originates from, i.e. is stored on, one or more server node(s) 2, wherein one of said server nodes 2 can likewise take one of many forms, for example the one of an individual computer that comprises corresponding processing, communication, and memory resources for storing and delivering the respective web content on request. However, a server node 2 may also take a form configured as virtual machine (VM) running on dedicated and/or distributed hardware resources of a data center. Of course web content can also be stored in a distributed fashion in the sense that server node 2 references one or more other nodes for delivering other parts of the requested web content, or optionally on more than one server node as indicated by the broken lines.

According to this embodiment, the user terminal 1 requests web content in the form of, for example, accessing a web page that has an address pointing to server node 2. In response, server node 2 conveys the content of the web page to the user terminal 1 where the corresponding application (browser) processes the received information and displays, plays back, or—generally—renders the content to the user. The user can then interact and the browser software can again contact server node 2 or other servers in response to the users' actions and requests.

Generally, the data and information exchanged by the user terminal 1 and server node 2 is handled by a communication channel 3 comprising all the involved network nodes and the respective links there in between. Usually, channel 3 involves the Internet and one or more access networks toward the respective sites of the user terminal 1 and the server node 2. These access networks may comprise local area networks (LAN), wireless local area networks (WLAN), asynchronous digital subscriber line (ADSL) networks, mobile communication networks, such as LTE, UMTS, GPRS, GSM, PCS, and related networks.

Each involved network, network node or subpart of the communication channel 3 may employ its own techniques, routers, and protocols for conveying data. However, there is usually some kind of common high level protocol defining in some way or another, data units 31, 32. In the example of the Internet protocol IP, these data units 31, 32 are usually referred to as so-called packets. Each of these data units (packets) includes header data for allowing correct routing of the unit/packet within the given network and, of course, the payload data that conveys some part or all of the respectively requested web content.

Usually, a web page session is initiated by requesting some web content (e.g. specifying an address of a web page and instructing a browser to access, retrieve, and display the web page). In response, the responsible server node 2 provides the data and information (resources) that is associated with the requested web content/page. In general, data units/packets that originate from the user terminal 1 are denoted by reference numeral 31, and data units/packets destined to the user terminal 1 are denoted by reference numeral 32. In the shown example of FIG. 1A, therefore, the web session may be initiated by sending a request in form of one or more data units/packets 31. The responsible server node 2 answers and provides the content in the form of data units/packets 32.

Along the present embodiment, inspection means 11 are provided for inspecting the web traffic involved in conveying the web content toward the user terminals. Specifically, these inspection means 11 analyse and/or process the data exchanged between user terminal 1 and server node 2 for extracting web traffic events. Such events can indicate addresses of a requester (usually the user terminal) and/or a destination (user terminal or one of the involved server nodes or network nodes), an identifier of a resource (name or URL of a file/resource, etc.). In general, however, a user terminal can change its address, for example due to an IP reconfiguration during one session, but still remains physically the same terminal. This may be considered by mapping old and new terminal addresses so as to perform accurate association of events to the individual user terminals, despite their addresses being subject to change over the time of one web page session.

The event may be accompanied by, associated to, or comprise as such, time information indicating a time when the event was generated or intercepted. In this way, it can be rendered possible to associate the extracted web traffic events to one user terminals and to one of a plurality of event types. The latter may specifically relate also to a type of or resource as such, in the sense that there is for example one event type for requesting one specific resource (e.g. the resource "image.jpg").

The mentioned analysis may take place on a data unit/packet level so that one or more individual data unit/packet(s) 31/32 are analysed. For example, packet 31 travels from the user terminal 1 to the server node 2 comprising a request for a specific resource being located (stored) at server node 2. In response, server node 2 conveys the content as one or more packet(s) 32 to the user terminal 1. Examples for implementing the inspection means 11 for inspecting the web traffic for extracting web traffic events include the technique of so-called deep packet inspection (DPI).

The extracted web page events are forwarded to a processing entity 12, in the form of an individual processing unity or distributed processing resources, that is configured to associate the extracted web traffic events to one of said user terminals and to one of a plurality of event types, build a statistic for values indicating times between two consecutive web traffic events that are associated to the same user terminal, calculate, from said statistic, a deviation for a pair of event types, and to correlate said web traffic events to a web page session based on said deviation. The corresponding configuration and aspects thereof are disclosed in greater detail in conjunction with the remaining Figures. Generally, any result, such as information on the performed correlation can be the output as data 4 in any suitable form as requested.

Figure 1B:
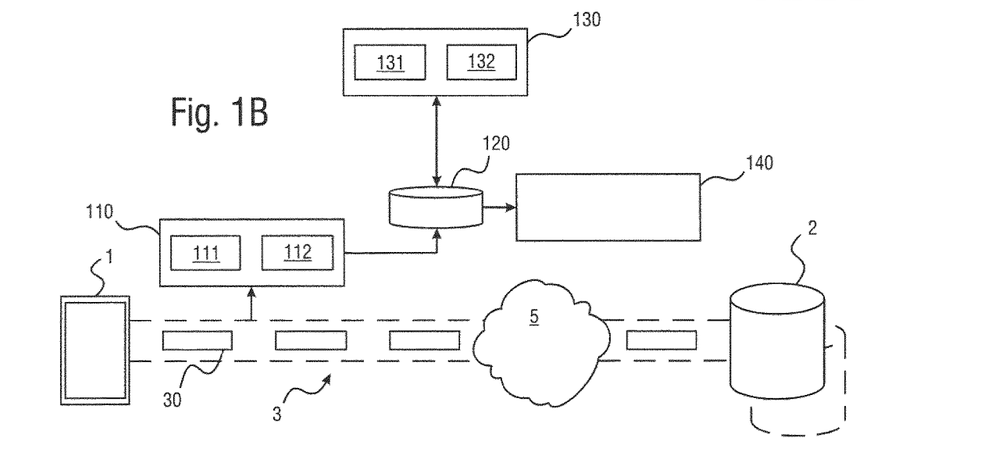

FIG. 1B shows a schematic view of inspecting web traffic in system configurations for conveying web content and correlating web traffic events to a web page session according to another embodiment of the present invention. Similarly to the configuration as described in conjunction with FIG. 1A, the system involves a user terminal 1 that accesses web content, one or more a server node(s) 2, a communication path 3 next to or as part of a packet data network 5 (e.g. internet or LAN of a data center). Packets 30 are exchanged by the user terminal 1 from and to the network 5.

In this embodiment, the system comprises a web resource request logging module 110 that includes a packet probe 111 that continuously captures HTTP packets 30 passing through the path 3. From the captured HTTP packets 30, an HTTP traffic processing function 112 analyses TCP and HTTP headers and stores selected parameters of each individual web resource request (as a web traffic event) into a data store 120. An example of a request (event) log stored into the data store 120 can contain one or more of the following information: request ID, client IP, time, request URL, HTTP referrer, content type, etc. Additional parameters might be logged as well, including resource size, download time, TCP session index, TCP setup time, round-trip time, etc.

The system of the present embodiment further comprises a web graph construction module 130 for web graph construction. This web graph construction module 130 monitors the web resource request log, and comprises a graph construction module 131 for constructing a web graph. The module can be either online or offline, where "online" means that the web graph is updated when each new resource request arrives to the log, and "offline" means that the graph construction algorithm is run in regular intervals to update recent web resource requests. The web graph is a directed graph where each node represents a resource URL, and each edge between a node URL A and node URL B represents the occurrence in the web resource request dataset of at least one request for URL B with HTTP referer header being URL A.

The representation of the graph can include a node view and an edge view. The following table shows a possible node view where each row corresponds to a node, which is a specific resource URL:

| REQUEST URL | CONTENT TYPE (REQUEST URL) | NUMBER OF VISITS |
| --- | --- | --- |
| http://www.a.com | text/html | 2 |
| http://www.a.com/t1.html | text/html | 1 |
| http://www.a.com/t2.html | text/html | 2 |
| http://www.a.com/p1.jpg | image/jpg | 2 |
| http://www.a.com/te.html | text/html | 1 |

The node properties can include the number visits starting from a given timestamp, and the content type of the resource. The following table shows the edge view, where each row corresponds to an edge in the graph and it contains columns referer URL, Request URL, and a list of time differences between referer URL (URL A) request time and request URL (URL B) request time (TDD standing for time difference distribution; ET standing for edge type, P standing for page, SR standing for sub-resource, and CONF standing for confidence):

| REFERER URL | REQUEST URL | TDD | ET CONF |
| --- | --- | --- | --- |
| NULL | http://www.a.com | 0, 0 | P 90% |
| http://www.a.com | http://www.a.com/t1.html | 1, NULL | P 70% |
| http://www.a.com | http://www.a.com/t2.html | 1, 1 | SR 80% |
| http://www.a.com | http://www.a.com/p1.jpg | 1, 2 | SR 90% |
| http://www.a.com | http://www.a.com/t3.html | NULL, 120 | P 80% |

If a user requested the URL A (a resource by an event), but never requested URL B, then a NULL is set as the time difference. If a user visits a URL B (another resource by another event) without referer (direct address type in address bar, or bookmark), then NULL is set as the referer and the time difference is considered to be 0. Generally, the request difference time list size may grow over time. Therefore, it can be preferable to have a maximum size on the list size. When a list reaches the maximum size, for example, the oldest entry can be erased. This is a way to only consider most recent requests (events). This procedure can automatically handle the case of dynamic web pages, where resources may have been part of the web page previously but not anymore.

An edge classification module 132 is configured to classify each edge URL A→URL B in the web graph into one of the two classes (1) new web page and (2) sub-resource, based on the observed time difference distribution for each edge. In this way, values indicating the times between two consecutive events are employed for correlating web traffic events to a web page session (i.e. the same one session or any other one).

In general, if for a majority of the samples, the request for URL B follows shortly after the request for URL A, with a narrow time distribution, then URL B is more likely to be a sub-resource of URL A. In this case, it is probably the browser that fetches resources automatically, and it is the resource download time and client processing time that constitutes the time difference between the requests. On another hand, if the time difference and the time difference distribution are large for an edge, it is more likely to be a link to a new page. Basically, it is the users that clicking the link for a new page. User behaviour is usually much more unpredictable than that of the browser, with some users clicking on a link very fast after viewing a page, while others may wait several minutes, or even hours before clicking a link. The above-mentioned majority can be characterized by the deviation that is explained in greater detail in conjunction with the other embodiments.

The input to the edge classification module 132 is an edge between a URL pair (URL A→URL B) from the web graph and the corresponding time difference vector Tv. The output is the classification of the edge between the URL pairs and the confidence in the classification. The module can compute from Tv one or more of the following the parameters: (1) Hit rate (URL A→URL B)=% of times a URL A request leads to a request for URL B with referer URL A; (2) Avg_time_diff=Average time difference between URL A request and URL B request; (3) Std_dev_time_diff=The standard deviation of the time difference between URL A request and URL B request.

In one embodiment, a rule and threshold based classification is employed in the edge classification module 132, by means of a set of rules and thresholds on above parameters, capturing the main reasoning of the algorithm, e.g.:

```
if (Hit-rate(URL A->URL B) > 90% and Std_dev_time_diff < 1):
    then sub-resource, conf = 0.9
else if (Hit-rate(URL A->URL B) > 70% and Std_dev_time_diff <
2 and Avg_time_diff < 5)
    then sub-resource, conf = 0.8
else
    new page, conf = 0,7
```

Above values are example figures only, in a real system the thresholds have to be tuned on the data in order to give the best performance The Std_dev_time_diff can be set according to the deviation calculated from the built statistic.

In another embodiment of the edge classification module 132, a machine learning technique is employed, specifically supervised learning/classification, and training the algorithm to classify the edges correctly, which may remove the need to set fixed thresholds for the different parameters. One aspect here is that the classification algorithm may involve a training set to learn from, where the edges have already been classified by some other method. This may be achieved by constructing a training set for the classification algorithm, consisting of a subset of the observed http requests where one can be fairly confident based on conventional web page grouping methods what the classification is. The following table shows the structure of such a training set, on which the machine learning algorithm can be trained to classify edge types based on the parameters computed from Tv:

| Hit_rate | Avg_time_diff | Std_dev_time_diff | Edge type |
|---|---|---|---|
| 50 | 17 | 10 | P |
| 99 | 4.5 | 2 | SR |
| 90 | 8 | 10 | P |

After the classification algorithm has been trained on the training set it can be applied to all the edges of the web graph, and can compute the edge type together with a confidence. The result can be inserted into the web graph data structure, exemplified in the above table.

Figure 1C:
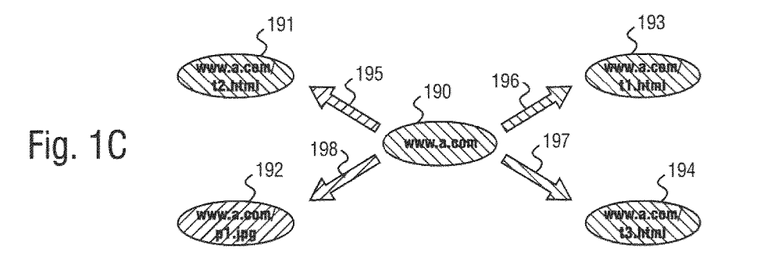
FIG. 1C shows a graphical representation of a so-called web graph.

FIG. 1C shows a graphical representation of a web graph, where the hatching of nodes 190 to 194 indicates content type, and the hatching edges 195 to 198 indicates edge type (sub-resource/page) computed by the edge classification module.

A web page reconstruction module 140 may then run online and monitor incoming resource requests (events). For each user terminal, it can maintain a list of active web page sessions. When a resource request is observed, it is added to a previous session, or a new web page session is created for this resource. In some cases, a resource could be a "lonely" resource that does not belong to any web page session, for example, when a user requests a single picture, or a single object file. Further procedures and aspects are described in greater details in conjunction with the remaining embodiments.

Generally, the mentioned HTTP (hypertext transfer protocol) is currently the main application protocol used to transport web content (pages). It runs on top of TCP and is usually a request-response protocol. If HTTP pipelining is used, then a request can be sent before the complete response to the previous request has been received. However, due to interoperability problems this functionality is not commonly implemented. This means that the client (terminal node) sends requests and waits for a complete response to be received before it sends the next request using the same TCP session. Thereby, one web page may consist of many different resources (or objects), such as HTML, images, JavaScript, CSS, Flash, etc. Further, browsers may typically open multiple TCP sessions to the same server node to improve parallelism and improve transfer speeds.

In general, an HTTP header can be identified as one form of web traffic events in the sense of the accompanying embodiments. Relevant header field may include content-type and content-length. Basically, these are the two fields in the HTTP header related to the content being requested and transferred in a given transaction. The content-type is the type of content in MIME (Multipurpose Internet Mail Extensions), in terms of file extension that is being requested. MIME is an internet standard that is used to describe the contents of various files. While the name MIME says "Mail", it is also used for web pages. MIME types are defined in HTML by the type attribute on links, objects, and script and style tags. The content-length field is the length of the request body in bytes.

Further, a HTTP referrer is an HTTP header field that identifies the address of a URL that is linked to the current request. When a web page is visited, by default, the employed software (browser) may report the last viewed page before clicking over to the current page, i.e. what the page "referred" to the current page. For example, someone searches on a search engine "www.q.com" a specific keyword "xyz" and gets a page of search results. The URL associated to the search page may look like this: http://www.q.com/search?xyz. The last part of the URL after the interrogation sign "?" informs the search keyword(s) that have been used. If one of the links listed in the search page results is clicked, the browser will request that new web page. In the HTTP request, the browser may also send a copy of the URL above as an HTTP referrer, showing how the client has arrived to this page, in this example, through a search at www.q.com with the keyword "xyz". In this case, one can typically say that the HTTP referrer is associated to a whole web page that points to another web page i.e. a set of resources.

However, the definition of the HTTP referrer is more general. A referrer is the URL of a previous item which led to this request. The referrer for an image, for example, is generally the HTML page on which it is to be displayed. In that case, one typically says that the HTTP referrer is associated to a sub-resource pointing to another resource. In summary, the URL field in the HTTP request can either be associated to a web page or to a single resource. In a similar way, the HTTP referrer header can either be associated to a web page or to a sub-resource. When these messages (events) are collected via passive probes to be analyzed, it is an object to achieve accurate differentiation between these cases.

Figure 2:
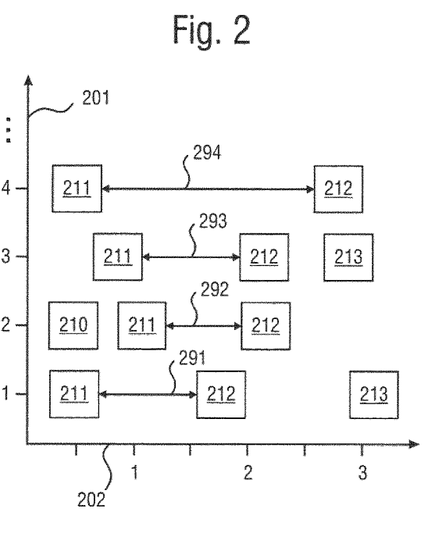
FIG. 2 shows a schematic view of a sequence of web traffic events associated to user terminals and event types according to embodiments of the present invention.

FIG. 2 shows a schematic representation of a sequence of web traffic events that have been associated to one of a plurality of user terminals. Specifically, individual user terminals are drawn along axis 201, where the terminals are numbered, as a mere example, in increasing order from 1 to 4. Naturally, any other suitable type of identifier may be used for pointing to one individual user terminal wherein also non-continuous enumerations can be considered. In particular the latter will be the consequence of a real world situation, in which user terminals join or leave the consideration by, respectively, starting requesting web content and ceasing to do so. One exemplary time line is shown with axis 202 in units 1 to 3 that may be, for example, milliseconds, seconds, or any other suitable time unit.

In FIG. 2 there are shown the events as associated to one user terminal which is specified by means of the position in relation to axis 201 and the association to one of a plurality of event types, wherein one event type is identified by one of the reference numerals 210 to 213. In this way, three events have been associated to user terminal "1", wherein the first is of event type 211, the second is of event type 212, and the third is of event type 213. Likewise, this assignment also applies to the events as shown in conjunction with user terminals "2" to "4". For the purpose of explaining the embodiments of the present invention, there are further shown time spans 291 to 294 between two events of the same event type 211 and 212 for each of the user terminals. As can be seen, the time spans 291 to 294 generally vary for each user terminal. More particularly, the time spans between the two events 211, 212 for user terminals "1", "2", and "3", namely spans 291, 292, and 293 are relatively short, whereas the time span 294 for events 211 to 212 for terminal "4" is relatively long.

In general, the statistic is built on values which indicate times between two consecutive web traffic events that are associated to the same user terminal. More specifically, the web traffic events are extracted by inspecting the web traffic, and the web traffic events are associated to one user terminal. Then, values can be calculated that indicate a time between two consecutive web traffic events that are associated to the same user terminal. For example, one event carries a request from a given IP address (identifying the user terminal) for a specific resource, and that event was intercepted at a given first time. Then, a consecutive event carries the requested resource, or a part thereof, to the same IP address at a given second time. In this way, two consecutive events can be associated to one terminal and a value indicating a time there in between can be determined.

The result is a plurality of values, each value indicating a time between two consecutive web traffic events that are associated to the same user terminal. Further, each web traffic event was associated to one of a plurality of event types, in the sense of one event type being a characteristic common to one or more web traffic events associated to different user terminals. In this way, two independent categorizations are made for the extracted web traffic events, one relative to the associated user terminal, and another one relative to event type. The latter event type can be any suitable characterization for relating two events associated to different terminals to one another. Further, a pair of event types refers to two event types that are related to each other. For example, one event type can be identified as requesting one specific resource and another event type can be identified as conveying a (first) part or the entirety of that requested resource. In this way, more than one web traffic events refer to the same action but are associated to different terminals. At the same time, also the event types of the pair are related to each other, in the present example as a request-response pair.

Given this two-dimensional categorization of the web traffic events, the plurality of values obtained by means of the user terminal association can now be grouped or filtered to obtain a subset of values that indicate the time between events of the same type. In other words, a set of values is obtained that indicate all the individual times that elapsed for each user terminal under consideration between a web traffic event of a first type and a web traffic event of a second type. Following the above example of requesting a resource, a set of values is obtained, wherein each value indicates the time between one individual user terminal requesting a resource and retrieving the resource. Another example would be to observe two consecutively requested resources. The values would then indicate, for each user terminal, the time that elapses between requesting a first resource and requesting a second resource.

Figure 3:
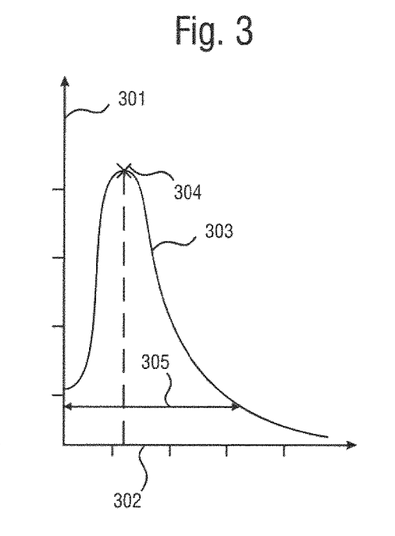
FIG. 3 shows a schematic view of a statistic according to embodiments of the present invention.

FIG. 3 shows a schematic view of such a statistic for values indicating times between two consecutive web traffic events. Specifically, statistic 303 represents, for example in the form of a histogram, for ach value along axis 302 the number of calculated values along axis 301. In other words, statistic 303 has one or more peaks for the most often occurring values. In the shown example, a maximum occurs at point 304 indicating that most values indicate a time of the corresponding intersection on axis 302. Likewise, a deviation 305 can be identified from statistic 303 indicating a region for the majority of values. For example, the deviation 305 can be defined so as to cover a given fraction of values that can be represented by the area as, for example, the integral of statistic 303 for the deviation range 305. As a more specific example, this region can be set as a representative majority (e.g. 75, 85, or 95%). Each value can thus be evaluated with regard to its association to the majority or remainder.

Generally, the extracted web traffic events can now be correlated to one web page session based on the deviation. More specifically, an extracted web traffic event is related to a user terminal, an event type, and a value in the corresponding statistic for the respective event type pair. For example, the related value can be assessed with regard to being part of the majority as defined by the deviation. If the value is part of the majority it can be followed that the web traffic event precedes or succeeds an event partner of a pair within a time that distinguishes the majority of events to the remainder. In other words, if the web traffic event has a timely relation to related web traffic events that follows a majority pattern in can be determined that the event is correlated to one web page session, whilst, if the time is too far from the majority pattern (in a sense "unusual"), the event can be found to belong to another web page session.

Following the example of two resources being requested consecutively, one can map embodiments of the present invention to an actual situation in a system for conveying web content to user terminals. Specifically, it can be assumed that one web page "www.a.com" includes (or: refers to) two resources A and B that are, for example, images A.jpg and B.jpg. At the same time, however, a second web page "www.b.com" may also include (or: refer to) resources B. If two web traffic events, one requesting resource A and the next one requesting resource B, follow each other within a timespan specified by the deviation, it can be concluded that the user terminal is accessing web page www.a.com and the corresponding (browser) software requests resources A and B. However, if one event is found requesting resource B that has no relation to an event requesting resource A, or is timely far away from such a request, it can be assumed that this request relates to accessing web page www.b.com instead. In general, the deviation can be set (adjusted) so as to distinguish events related one web page session from other events.

Figure 4:
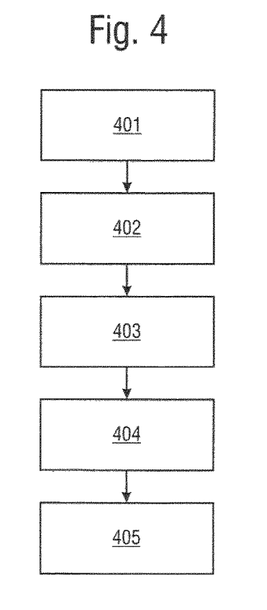
FIG. 4 shows a flow chart of a method embodiment of the present invention.

FIG. 4 shows a flow chart of a method embodiment of the present invention. In particular, this method embodiment is for implementing a correlating of web traffic events to a web page session in a system for conveying web content to a plurality of user terminals. The present method embodiment involves a step 401 of inspecting a web traffic involved in conveying the web content toward the user terminals for extracting web traffic events. The extracted web traffic events are associated in a step 402 to one of said user terminals and to one of a plurality of event types. In a step 403, a statistic is built for values indicating times between two consecutive web traffic events that are associated to the same user terminal. From this statistic, a deviation is calculated in a step 404 for a pair of event types, and in a step 405 the web traffic events are correlated to a web page session based on the calculated deviation.

Figure 5:
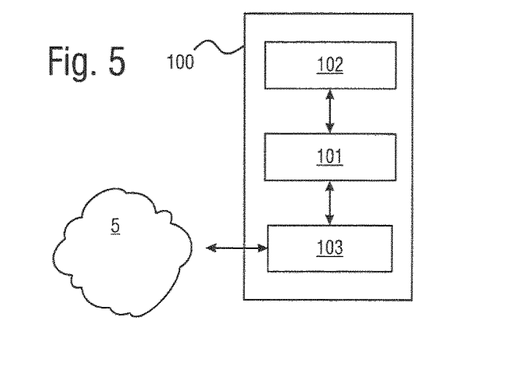
FIG. 5 shows a schematic view of a general entity/apparatus embodiment of the present invention.

FIG. 5 shows a schematic view of a general entity/apparatus embodiment of the present invention. The entity 100 comprises a processing resources 101, memory resources 102, and communication resources 103 for communication with a network 5. The latter may carry the web traffic subject to inspection. The memory resources 102 may store code for instructing the processing resources 101 to implement the steps of method embodiments of the present invention.

More specifically, the memory resources 102 may store code that instructs the processing resources 101 to implement one or more of inspecting a web traffic involved in conveying the web content toward the user terminals for extracting web traffic events, associating the extracted web traffic events to one of said user terminals and to one of a plurality of event types, building a statistic for values indicating times between two consecutive web traffic events that are associated to the same user terminal, calculating, from said statistic, a deviation for a pair of event types, and correlating said web traffic events to a web page session based on said deviation. If only part of the above is implemented, then the remainder may be implemented by other entities, equipped similarly with processing resources, these other entities either coupled directly to entity 100 or to the network 5. In general, the term entity refers to any one of a dedicated piece of hardware, parts of distributed hardware, virtual machines, modules, and the like.

Figure 6:
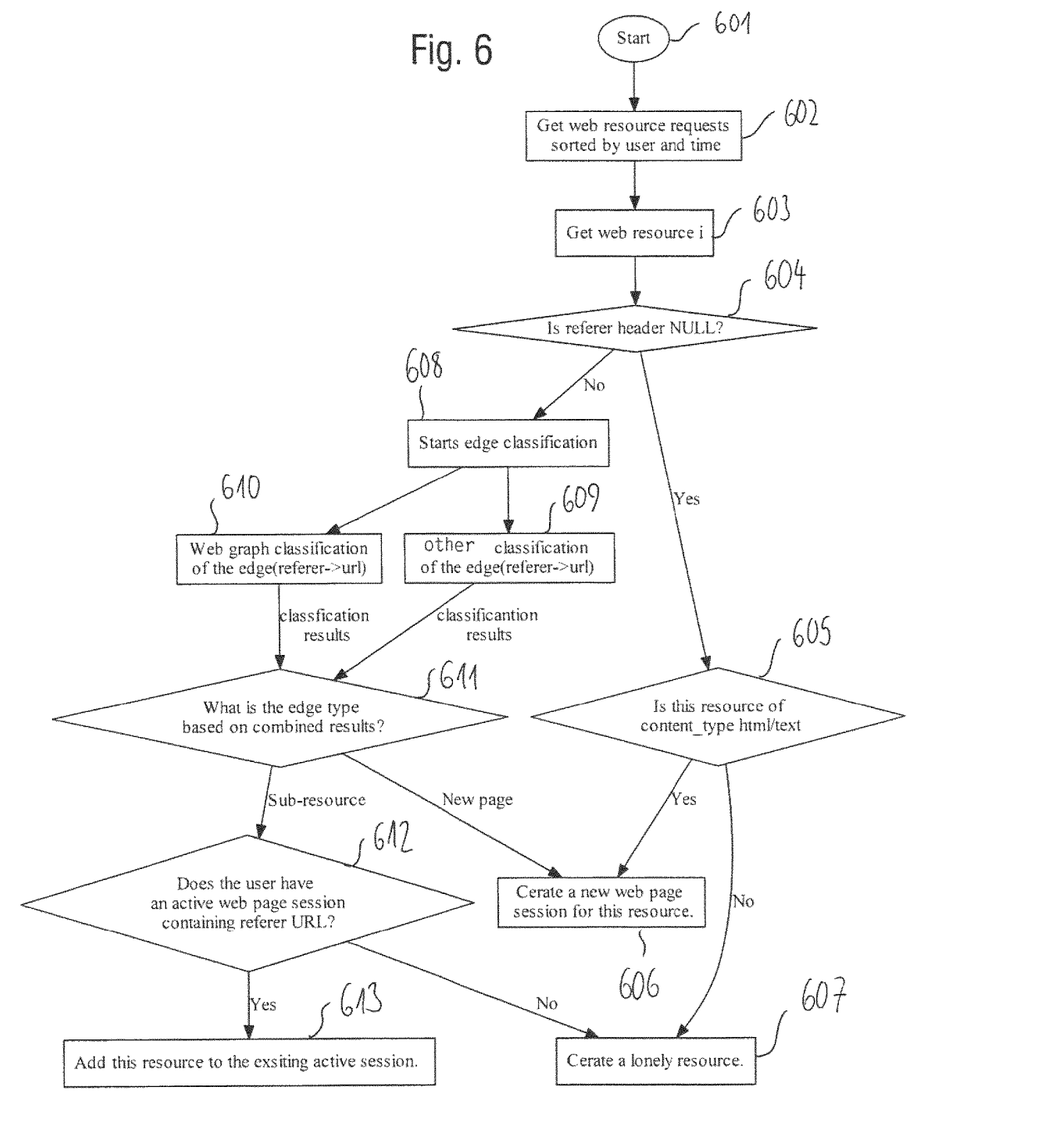
FIG. 6 shows a flow chart of a further method embodiment of the present invention.

FIG. 6 shows a flow chart of a further method embodiment of the present invention. More specifically, this embodiment focusses on the correlating in the form of grouping one individual resource (or the corresponding web traffic event) to a web page session. Basically, it is first checked whether there is a referer for this resource. If there is no referer, then this resource is a new web page or a lonely resource depending on the content type. If there is a referer, edge classification function is executed. The edge classification function uses both conventional classification and web graph edge classification. The results from both systems are considered and a combined classification result is obtained. If the edge is of type "new page", a new web session is created for this resource. If the edge is of type sub-resource, an active web page session from the user with the given referer URL is looked up. If a matching active web session could be obtained, it is added to the session. Otherwise it is added as a lonely resource.

More specifically, the above outlined basic concept considers, starting from 601, a step 602 of getting web resource requests sorted by user and time. An ith resource is obtained in step 603, and in step 604 it is checked whether the referrer header is NULL (i.e. no header). If header is NULL ("YES" in step 604), it is checked in step 605 whether the resource is of content type HTML/text. If "NO" in step 605, a lonely resource is created in step 607. If "YES" in step 605, a new web page session for this resource is created in step 606. If, however, the header is not NULL ("NO" in step 604), in step 608 edge classification is started. Other, e.g. conventional, classification of the edge (referrer to URL) is performed in step 609. In step 610 web graph classification of the edge (referrer to URL) according to one of the disclosed embodiments is carried out. Both classification results from steps 609 and 610 are checked in step 611 with regard to what is the edge type based on combined results. If the result is "new page" it is continued to step 606, if the result is "sub-resource", in step 612 it is checked whether the user has an active web page session containing referrer URL. If "NO", a lonely resource is again created in step 607, if "YES", this resource is added to the existing active session in step 613.

In general, embodiments of the present invention are to improve the accuracy of reconstruction of web page accesses by using additional information from previous web accesses, as collected by a passive probe. These embodiments may, however, well coexist to conventional web page grouping methodologies, but provides an additional dimension to consider in the classification. By parsing TCP and HTTP headers from the probe, information including client IP, request URL, request time, and HTTP referer can be obtained for each resource request. Using this information for multiple users in an operator's network, a web graph can be constructed in the form of a statistic, where each node in the graph is a resource URL, and each directed edge between URL A and URL B represents that there is at least one request for URL B where the URL A is the HTTP referer. In the URL web graph, an edge between two resources from URL A to URL B suggests one of the two potential cases (1) URL B is a sub-resource of URL A and (2) There is a link from URL A to URL B.

Furthermore, embodiments of the present invention involve an algorithm that classifies each edge in the URL graph as one of the above cases. One concept of this algorithm is to collect statistics on how often and with which time distribution a request for URL A is followed by a request for URL B, and use this information to classify URL B into one of the two above cases. In particular, the time difference, and time difference distributions (narrow deviation) can be small for sub-resources, as it is fetched by the browser automatically. On another hand, the average and distribution of time differences (deviation) for links can be much larger, as it is based on users' web clicks.

Embodiments of the present invention may in general provide one or more of the following advantages. Firstly, embodiments of the present invention allow for reconstructing web page accesses more accurately than previous solutions, even from locations where no direct knowledge on web pages are available. Instead of only analyzing a single user's web resource request log, web request logs from many users are used to construct a web graph in the form of a statistic, which is used as a knowledge base to obtain a characteristic deviation for grouping events to webpages. In particular, by considering the time difference distributions among requests, a more accurate identification and grouping (correlation) can be obtained with regard to a request for a resource is generated by a computer (e.g. a browser) that would point to sub-resource request belonging to one wen page, or by a human action that would point to different web sessions. An example for the latter is a (manual) click to a link usually taking place at later time as compared to the automated one-by-one retrieval of resources by a browser.

Although detailed embodiments have been described, these only serve to provide a better understanding of the invention defined by the independent claims and are not to be seen as limiting.

The invention claimed is:

1. A method of classifying, in a communication system that communicates web content to a plurality of user terminals operating in the communication system, web traffic events to a web page session, the method comprising the steps of:
   capturing, using a packet probe, data packets exchanged between one or more servers of the communication system and the plurality of user terminals from web traffic conveying the web content toward the plurality of user terminals;
   extracting and storing, using deep packet inspection, the web traffic events from the captured data packets, wherein each of the extracted web traffic events identifies an associated user terminal of the plurality of user terminals, a requested web resource and an associated time information indicating a time when the extracted web traffic event was generated;
   associating each of the extracted web traffic events with the associated user terminal identified in the extracted web traffic event;
   associating each of the extracted web traffic events to one of a plurality of web traffic event types, wherein each of the plurality of web traffic event types has a characteristic common to each of the extracted web traffic events;
   determining a set of values, wherein each value of the set of values indicates a time between two consecutive extracted web traffic events that are associated to a same user terminal of a plurality of user terminals;
   calculating, from said set of values, a standard deviation of time between a pair of web traffic event types based on an associated web traffic event type of each of the two consecutive extracted web traffic events of each value of the set of values, wherein the pair of web traffic event types comprises two web traffic event types that are related to each other;
   classifying said two consecutive extracted web traffic events associated with the same user terminal of the plurality of user terminals as being one of a same web page session based on the time between the two consecutive extracted web traffic events associated with the same user terminal of the plurality of user terminals being within said calculated standard deviation of time and a different web page session based on the time between the two consecutive extracted web traffic events associated with the same user terminal of the plurality of user terminals not being within said calculated standard deviation of time; and
   reconstructing web page accesses by the plurality of user terminals operating in the communication system using the classified two consecutive web traffic events.

2. The method of claim 1, wherein the web traffic conveying the web content toward the plurality of user terminals includes requests for retrieving web resources and responses for conveying the requested web resources, and wherein the web traffic events relate to at least one of requesting or receiving a web content resource.

3. The method of claim 2, wherein the web content resource is any one of a HTML, picture, image, sound, video, multimedia, executable resource.

4. The method of claim 1, wherein said two consecutive extracted web traffic events of each value of the set of values relate events occurring pairwise when accessing a web page in one web page session.

5. The method of claim 1, wherein extracting the web traffic events from the captured data packets comprises extracting headers from the data packets that comprise address information and resource identification information.

6. The method of claim 1, further comprising a step of associating the associated time information to the extracted web traffic events.

7. The method of claim 1, wherein the step of capturing the data packets exchanged between one or more servers of the communication system and the plurality of user terminals comprises a deep packet inspection procedure that extracts headers as said web traffic events.

8. The method of claim 1, wherein calculating, from said set of values, the standard deviation of time between the pair of web traffic event types comprises calculating the standard deviation of time based on a majority of values corresponding to a maximum value of the set of values.

9. A network entity apparatus that classifies, in a communication system that communicates web content to a plurality of user terminals operating in the communication system, web traffic events to a web page session, the network entity apparatus comprising:
   a processor; and
   a memory coupled to the processor and storing computer readable program code configured when executed by the processor to cause the processor to perform operations to:
   capture data packets, using a packet probe of the network entity, exchanged between one or more servers of the communication system and the plurality of user terminals from web traffic conveying the web content toward the plurality of user terminals;
   extract and store, using deep packet inspection, the web traffic events from the captured data packets, wherein each of the extracted web traffic events identifies an associated user terminal of the plurality of user terminals, a requested web resource and an associated time information indicating a time when the extracted web traffic event was generated;

associate each of the extracted web traffic events with the associated user terminal identified in the extracted web traffic event;

associated each of the extracted web traffic events to one of a plurality of web traffic event types, wherein each of the plurality of web traffic event types has a characteristic common to each of the extracted web traffic events;

determine a set of values, wherein each value of the set of values indicates a time between two consecutive extracted web traffic events that are associated to a same user terminal of the plurality of user terminals;

calculate, from said set of values, a standard deviation of time between a pair of web traffic event types based on an associated web traffic event type of each of the two consecutive extracted web traffic events of each value of the set of values, wherein the pair of web traffic event types comprises two web traffic event types that are related to each other;

classify said two consecutive extracted web traffic events associated with the same user terminal of the plurality of user terminals as being one of a same web page session based on the time between the two consecutive extracted web traffic events associated with the same user terminal of the plurality of user terminals being within said calculated standard deviation of time and a different web page session based on the time between the two consecutive extracted web traffic events associated with the same user terminal of the plurality of user terminals not being within said calculated standard deviation of time; and reconstruct web page accesses by the plurality of user terminals operating in the communication system using the classified two consecutive web traffic events.

10. The network entity apparatus of claim 9, wherein the web traffic conveying the web content toward the plurality of user terminals includes requests for retrieving web resources and responses for conveying the requested web resources, and wherein the web traffic events relate to at least one of requesting or receiving a web content resource.

11. The network entity apparatus of claim 10, wherein the web content resource is any one of a HTML, picture, image, sound, video, multimedia, executable resource.

12. The network entity apparatus of claim 9, wherein said two consecutive extracted web traffic events of each value of the set of values relate events occurring pairwise when accessing a web page in one web page session.

13. The network entity apparatus of claim 9, wherein the operation for extracting the web traffic events from the captured data packets comprises extracting headers from the data packets that comprise address information and resource identification information.

14. The network entity apparatus of claim 9, the operations further comprising associating the associated time information to the extracted web traffic event.

15. The network entity apparatus of claim 9, wherein the calculated standard deviation of time indicates whether the two consecutive extracted web traffic events of each value of the set of values belong to one same web page session.

16. The network entity apparatus of claim 9, wherein the operation for capturing the data packets exchanged between one or more servers of the communication system and the plurality of user terminals comprises a deep packet inspection procedure that extracts headers as said web traffic events.

17. A computer program product that classifies, in a communication system that communicates web content to a plurality of user terminals operating in the communication system, web traffic events to a web page session, the computer program product comprising a non-transitory computer readable storage medium storing computer readable program code instructing a processor to:

capture data packets, using a packet probe, exchanged between one or more servers of the communication system and the plurality of user terminals from web traffic conveying the web content toward the plurality of user terminals;

extract and store, using deep packet inspection, the web traffic events from the captured data packets, wherein each of the extracted web traffic events identify an associated user terminal of the plurality of user terminals, a requested web resource and an associated time information indicating a time when the extracted web traffic event was generated;

associate each of the extracted web traffic events with the associated user terminal identified in the extracted web traffic event;

associate each of the extracted web traffic events to one of a plurality of web traffic event types, wherein each of the plurality of web traffic event types has a characteristic common to each of the extracted web traffic events;

determine a set of values, wherein each value of the set of values indicates a time between two consecutive extracted web traffic events that are associated to a same user terminal of the plurality of user terminals;

calculate, from said set of values, a standard deviation of time between a pair of web traffic event types based on an associated web traffic event type of each of the two consecutive extracted web traffic events of each value of the set of values, wherein the pair of web traffic event types comprises two web traffic event types that are related to each other;

classify said two consecutive extracted web traffic events associated with the same user terminal of the plurality of user terminals as being one of a same web page session based on the time between the two consecutive extracted web traffic events associated with the same user terminal of the plurality of user terminals being within said calculated standard deviation of time and a different web page session based on the time between the two consecutive extracted web traffic events associated with the same user terminal of the plurality of user terminals not being within said calculated standard deviation of time; and reconstruct web page accesses by the plurality of user terminals operating in the communication system using the classified two consecutive web traffic events.

* * * * *